United States Patent
Nakamura

(10) Patent No.: US 11,087,448 B2
(45) Date of Patent: Aug. 10, 2021

(54) APPARATUS, METHOD, AND NON-TRANSITORY RECORDING MEDIUM FOR A DOCUMENT FOLD DETERMINATION BASED ON THE CHANGE POINT BLOCK DETECTION

(71) Applicant: KYOCERA DOCUMENT SOLUTIONS INC., Osaka (JP)

(72) Inventor: Masayoshi Nakamura, Torrance, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 116 days.

(21) Appl. No.: 16/426,226

(22) Filed: May 30, 2019

(65) Prior Publication Data
US 2020/0380657 A1   Dec. 3, 2020

(51) Int. Cl.
  *G06K 9/00*   (2006.01)
  *G06T 7/00*   (2017.01)
  *G06K 9/34*   (2006.01)

(52) U.S. Cl.
  CPC ........ *G06T 7/0002* (2013.01); *G06K 9/00463* (2013.01); *G06K 9/348* (2013.01);
  (Continued)

(58) Field of Classification Search
  CPC .............. G06K 9/00463; G06K 9/348; G06T 2207/30176
  See application file for complete search history.

(56) References Cited

U.S. PATENT DOCUMENTS 4,637,057 A * 1/1987 Kermisch ............... G06T 3/602
                                                                 345/657
5,172,422 A * 12/1992 Tan .......................... G06K 9/32
                                                                 358/488
(Continued)

FOREIGN PATENT DOCUMENTS

EP         1455299 A3 * 5/2006 ........... H04N 1/4092
JP      2002-051218 A    2/2002
(Continued)

OTHER PUBLICATIONS

A Survey of Methods—Segmentation, Richard G. Casey et al., IEEE, 0162-8828, Jul. 1996, pp. 1-17 (Year: 1996).*

*Primary Examiner* — Jayesh A Patel
(74) *Attorney, Agent, or Firm* — Li & Cai Intellectual Property (USA) Office

(57) ABSTRACT

An image processing apparatus includes a character determining unit configured to divide the read image into multiple blocks, each of the multiple blocks including multiple characters, and determine an inclination of each of the multiple characters included in each of the multiple blocks, a block processing unit configured to detect a change point block, the change point block being a block including characters having an inclination included in a first inclination interval, a number of the characters being equal to or larger than a first threshold, and including characters having an inclination included in a second inclination interval, a number of the characters being equal to or larger than the first threshold, the second inclination interval being different from the first inclination interval, and a fold determining unit configured to determine that the document is folded if the change point block is detected.

19 Claims, 12 Drawing Sheets

(52) U.S. Cl.
CPC ............. *G06T 2207/10008* (2013.01); *G06T 2207/30168* (2013.01); *G06T 2207/30176* (2013.01)

(56) References Cited

U.S. PATENT DOCUMENTS

| | | | | |
|---|---|---|---|---|
| 5,359,706 A * | 10/1994 | Sterling | ................. | G06T 3/602 345/657 |
| 5,692,069 A * | 11/1997 | Hanson | ................. | G06K 9/342 382/171 |
| 5,986,672 A * | 11/1999 | Groezinger | ............. | G06T 3/602 345/649 |
| 6,173,088 B1 * | 1/2001 | Koh | ................. | G06K 9/3208 358/488 |
| 6,566,340 B2 * | 5/2003 | Frick | ................. | A61P 3/00 514/25 |
| 6,731,795 B1 * | 5/2004 | Ricard | ................. | G06T 11/40 375/240.12 |
| 6,785,428 B1 * | 8/2004 | Stolin | ................. | G06T 3/608 345/649 |
| 6,956,587 B1 * | 10/2005 | Anson | ................. | H04N 1/3873 345/619 |
| 7,003,160 B2 * | 2/2006 | Horie | ................. | G06K 9/40 382/199 |
| 7,106,904 B2 * | 9/2006 | Shima | ................. | G06K 9/00449 382/216 |
| 8,855,418 B2 * | 10/2014 | Christiansen | ............. | G06T 7/11 382/173 |
| 9,374,500 B2 * | 6/2016 | Tsugimura | ........... | H04N 1/4092 |
| 10,606,933 B2 * | 3/2020 | Breuel | ................. | G06F 40/166 |
| 2008/0267502 A1 * | 10/2008 | Youngers | ............. | G06K 9/3275 382/176 |
| 2010/0149603 A1 * | 6/2010 | Maeda | ............... | H04N 1/00748 358/449 |
| 2010/0238459 A1 * | 9/2010 | Yamazaki | ........... | G06K 15/105 358/1.5 |
| 2010/0239165 A1 * | 9/2010 | Wu | ....................... | G06K 9/2054 382/176 |
| 2014/0126811 A1 * | 5/2014 | Ihara | .................... | G06K 9/4604 382/165 |
| 2015/0281513 A1 * | 10/2015 | Ozawa | ................. | H04N 1/3878 358/474 |
| 2016/0180164 A1 * | 6/2016 | Xiong | ................... | G06F 40/103 382/177 |
| 2017/0220886 A1 * | 8/2017 | Canero Morales | .... | G06K 9/325 |
| 2017/0366705 A1 * | 12/2017 | Wada | ....................... | G06T 5/006 |
| 2019/0205638 A1 * | 7/2019 | Zhang | ................. | G06K 9/2054 |
| 2019/0303702 A1 * | 10/2019 | Collet | .................. | G06K 9/3275 |
| 2019/0354791 A1 * | 11/2019 | Goubalan | ........... | G06K 9/4638 |
| 2019/0354818 A1 * | 11/2019 | Reisswig | ........... | G06K 9/00456 |

FOREIGN PATENT DOCUMENTS

| | | | | |
|---|---|---|---|---|
| JP | 2002051218 A | * | 12/2002 | ............ G06T 5/005 |
| JP | 2014-068243 A | | 4/2014 | |
| JP | 2014068243 A | * | 4/2014 | |
| JP | 2015-198306 A | | 11/2015 | |
| JP | 2015198306 A | * | 11/2015 | ........... H04N 1/4092 |
| JP | 2016-157113 A | | 9/2016 | |
| JP | 2016158113 A | * | 9/2016 | |
| JP | 2017-028447 A | | 2/2017 | |
| JP | 2017028447 A | * | 2/2017 | |
| KR | 20070078509 A | * | 8/2007 | |

* cited by examiner

(12) United States Patent

APPARATUS, METHOD, AND NON-TRANSITORY RECORDING MEDIUM FOR A DOCUMENT FOLD DETERMINATION BASED ON THE CHANGE POINT BLOCK DETECTION

BACKGROUND OF THE INVENTION

1. Field of the Invention

The present disclosure relates to an image processing apparatus that processes a read image, which is generated by optically reading a document by an image scanner.

2. Description of Related Art

An image scanner optically reads a document and generates a read image.

SUMMARY OF THE INVENTION

According to an embodiment of the present disclosure, there is provided an image processing apparatus, including:
a controller circuit configured to operate as
an image obtaining unit configured to obtain a read image, the read image being generated by optically reading a document including multiple characters by an image scanner,
a character determining unit configured to
divide the read image into multiple blocks, each of the multiple blocks including multiple characters, and
determine an inclination of each of the multiple characters included in each of the multiple blocks,
a block processing unit configured to detect a change point block, the change point block being a block including characters having an inclination included in a first inclination interval, a number of the characters being equal to or larger than a first threshold, and including characters having an inclination included in a second inclination interval, a number of the characters being equal to or larger than the first threshold, the second inclination interval being different from the first inclination interval, and
a fold determining unit configured to determine that the document is folded if the change point block is detected.

According to an embodiment of the present disclosure, there is provided a non-transitory computer readable recording medium that records an image processing program causing a controller circuit of an image processing apparatus to operate as:
an image obtaining unit configured to obtain a read image, the read image being generated by optically reading a document including multiple characters by an image scanner;
a character determining unit configured to
divide the read image into multiple blocks, each of the multiple blocks including multiple characters, and
determine an inclination of each of the multiple characters included in each of the multiple blocks;
a block processing unit configured to detect a change point block, the change point block being a block including characters having an inclination included in a first inclination interval, a number of the characters being equal to or larger than a first threshold, and including characters having an inclination included in a second inclination interval, a number of the characters being equal to or larger than the first threshold, the second inclination interval being different from the first inclination interval; and
a fold determining unit configured to determine that the document is folded if the change point block is detected.

According to an embodiment of the present disclosure, there is provided an image processing method, including:
by an image obtaining unit, obtaining a read image, the read image being generated by optically reading a document including multiple characters by an image scanner;
by a character determining unit,
dividing the read image into multiple blocks, each of the multiple blocks including multiple characters, and
determining an inclination of each of the multiple characters included in each of the multiple blocks;
by a block processing unit, detecting a change point block, the change point block being a block including characters having an inclination included in a first inclination interval, a number of the characters being equal to or larger than a first threshold, and including characters having an inclination included in a second inclination interval, a number of the characters being equal to or larger than the first threshold, the second inclination interval being different from the first inclination interval; and
by a fold determining unit, determining that the document is folded if the change point block is detected.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 4 shows an example of a read image;
FIG. 5 shows an example of the read image, from which handwritten characters are removed;
FIG. 6 shows an example of a read image divided into multiple blocks;
FIG. 10 illustrates an example of blocks included in a read image;
FIG. 11 schematically shows an example of the blocks of FIG. 10;
and
FIG. 12 schematically shows another example of blocks in a read image.

DETAILED DESCRIPTION OF THE PREFERRED EMBODIMENTS

Hereinafter, an embodiment of the present disclosure will be described with reference to the drawings.

1. Hardware Configuration of Image Forming Apparatus

Figure 1:
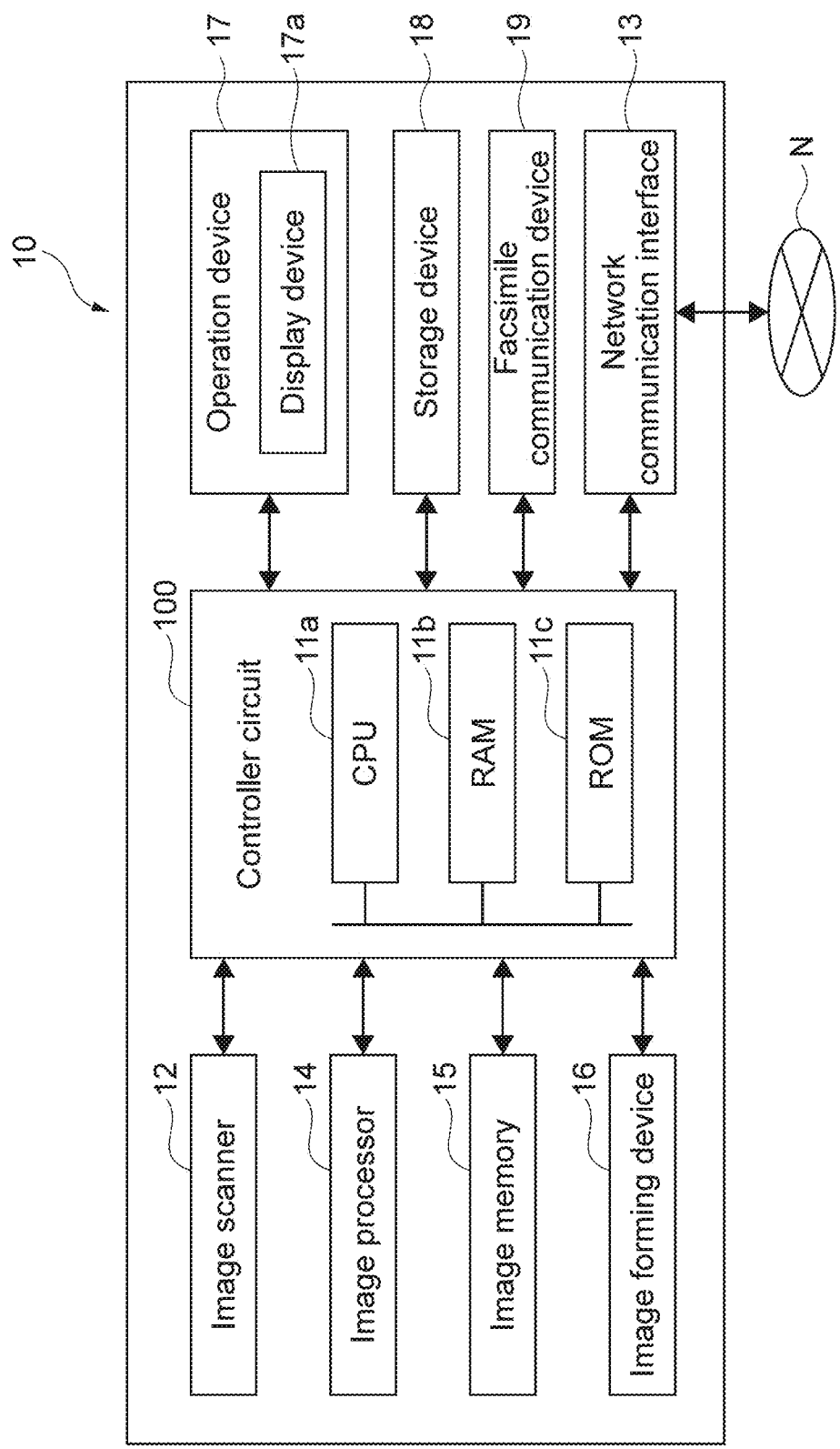
FIG. 1 shows a hardware configuration of an image forming apparatus according to an embodiment of the present disclosure.

FIG. 1 shows a hardware configuration of an image forming apparatus according to an embodiment of the present disclosure.

According to the present embodiment, the image forming apparatus 10 (for example, MFP, Multifunction Peripheral) including the image scanner 12 will be described as an example of an image processing apparatus. However, an image processing apparatus may be an information processing apparatus (personal computer, tablet computer, smartphone, etc.) (not shown) configured to receive a read image, which is generated by optically reading a document by an external image forming apparatus (not shown). In this case, the information processing apparatus may receive the read image by directly communicating with the external image forming apparatus. Alternatively, the information processing apparatus may download the read image, which is uploaded onto a server apparatus or the like (not shown) by the external image forming apparatus.

The image forming apparatus 10 includes the controller circuit 100. The controller circuit 100 includes the CPU (Central Processing Unit) 11a (processor), the RAM (Random Access Memory) 11b, the ROM (Read Only Memory) 11c (memory), dedicated hardware circuits, and the like and performs overall operational control of the image forming apparatus 10. The CPU 11a loads information processing programs (including image processing program) stored in the ROM 11c in the RAM 11b and executes the information processing programs. The nonvolatile ROM 11c stores information processing programs executed by the CPU 11a and data. The ROM 11c is an example of a non-transitory computer readable recording medium.

The controller circuit 100 is connected to the image scanner 12, the image processor 14 (including GPU (Graphics Processing Unit)), the image memory 15, the image forming device 16 (printer), the operation device 17 including the display device 17a (touch panel), the large-volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 including the display device 17a (touch panel) is an embodiment of an input device. A sound input device including a microphone may be provided as an input device.

In the present embodiment, the image scanner 12 optically reads a document, and generates an image (hereinafter referred to as read image). In the present embodiment, the document optically read by the image scanner 12 includes multiple characters. Typically, the "characters" are text data generated by using word processor software and printed on a medium (typically, paper). The "characters" do not include handwritten characters. The document includes, as the multiple characters, multiple characters arrayed in one direction (for example, lateral direction), the multiple characters being arrayed in series in a direction example, longitudinal direction) that crosses (typically, perpendicularly) the one direction. The "document" simply means a physical medium (typically, paper) in the present embodiment.

The image scanner 12 optically reads a document fed by an automatic feeder or a document put on a platen (not shown) by a user.

2. Functional Configuration of Image Forming Apparatus

Figure 2:
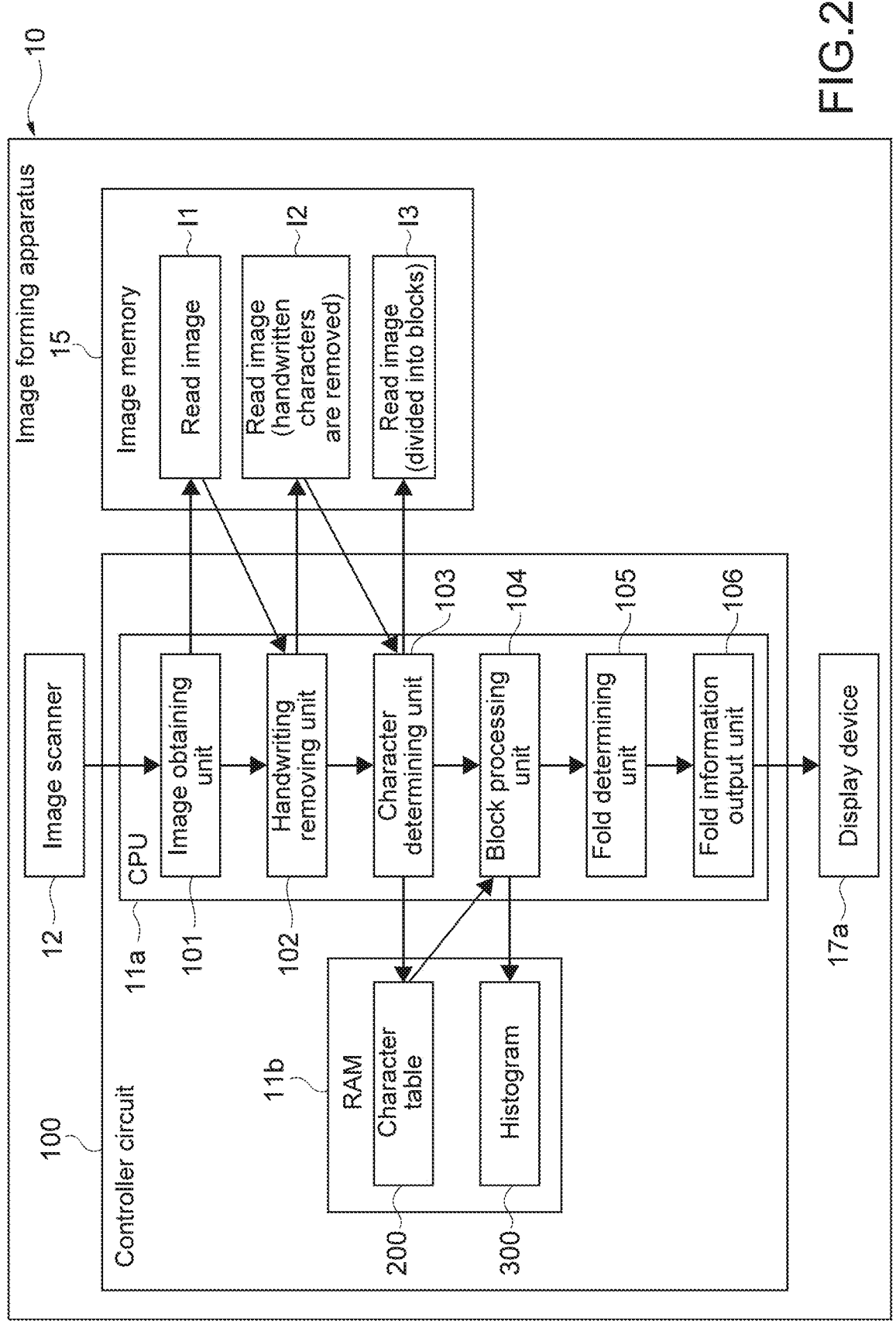
FIG. 2 shows a functional configuration of the image forming apparatus.

FIG. 2 shows a functional configuration of the image forming apparatus.

In the controller circuit 100 of the image forming apparatus 10, the CPU 11a loads an image processing program stored in the ROM 11c in the RAM 11b and executes the image processing program to thereby operate as the image obtaining unit 101, the handwriting removing unit 102, the character determining unit 103, the block processing unit 104, the fold determining unit 105, and the fold information output unit 106.

3. Operational Flow of Image Forming Apparatus

Figure 3:
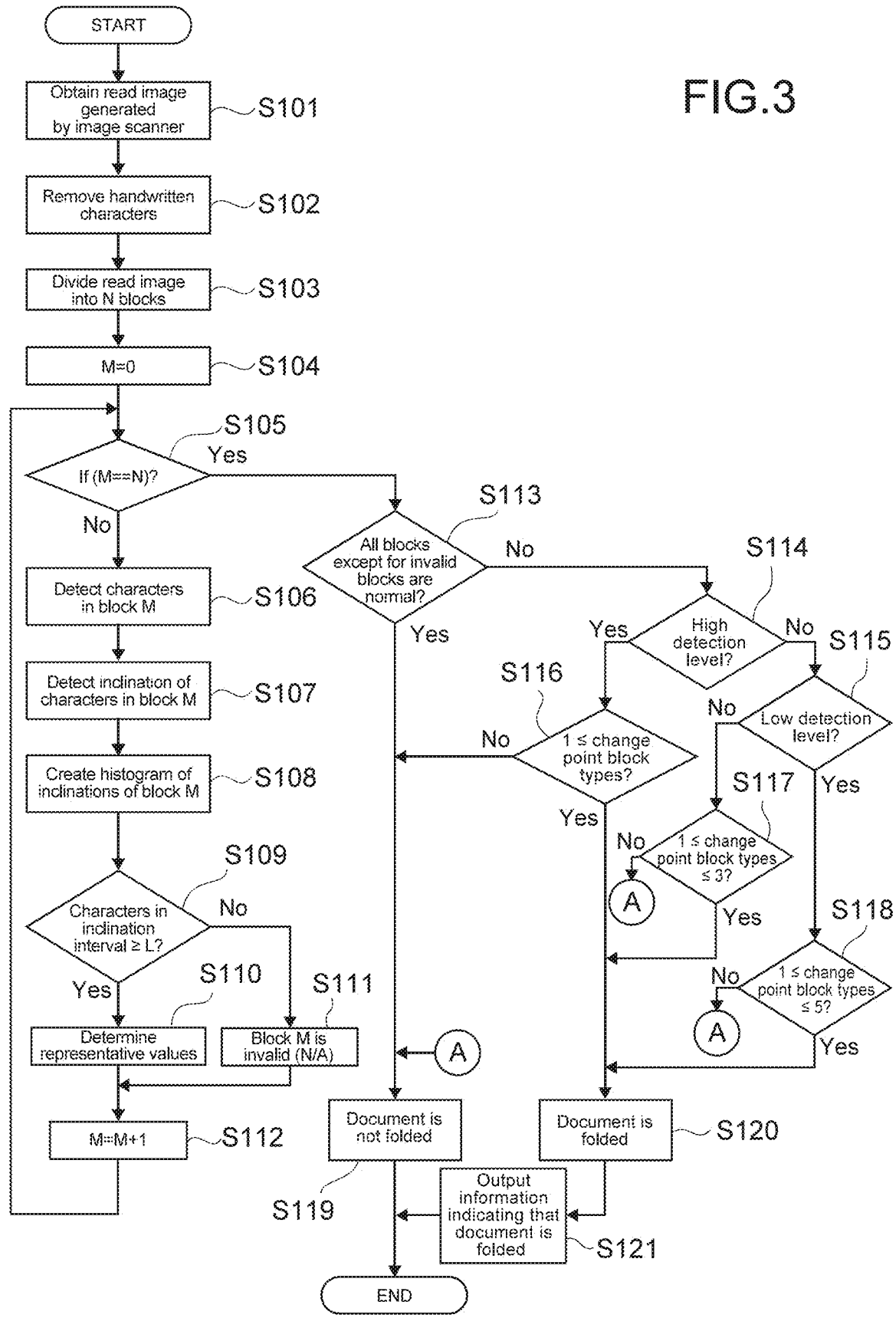
FIG. 3 shows an operational flow of the image forming apparatus.

FIG. 3 shows an operational flow of the image forming apparatus.

The image obtaining unit 101 obtains the read image I1 generated by optically reading a document by the image scanner 12 (Step S101).

Figure 4:
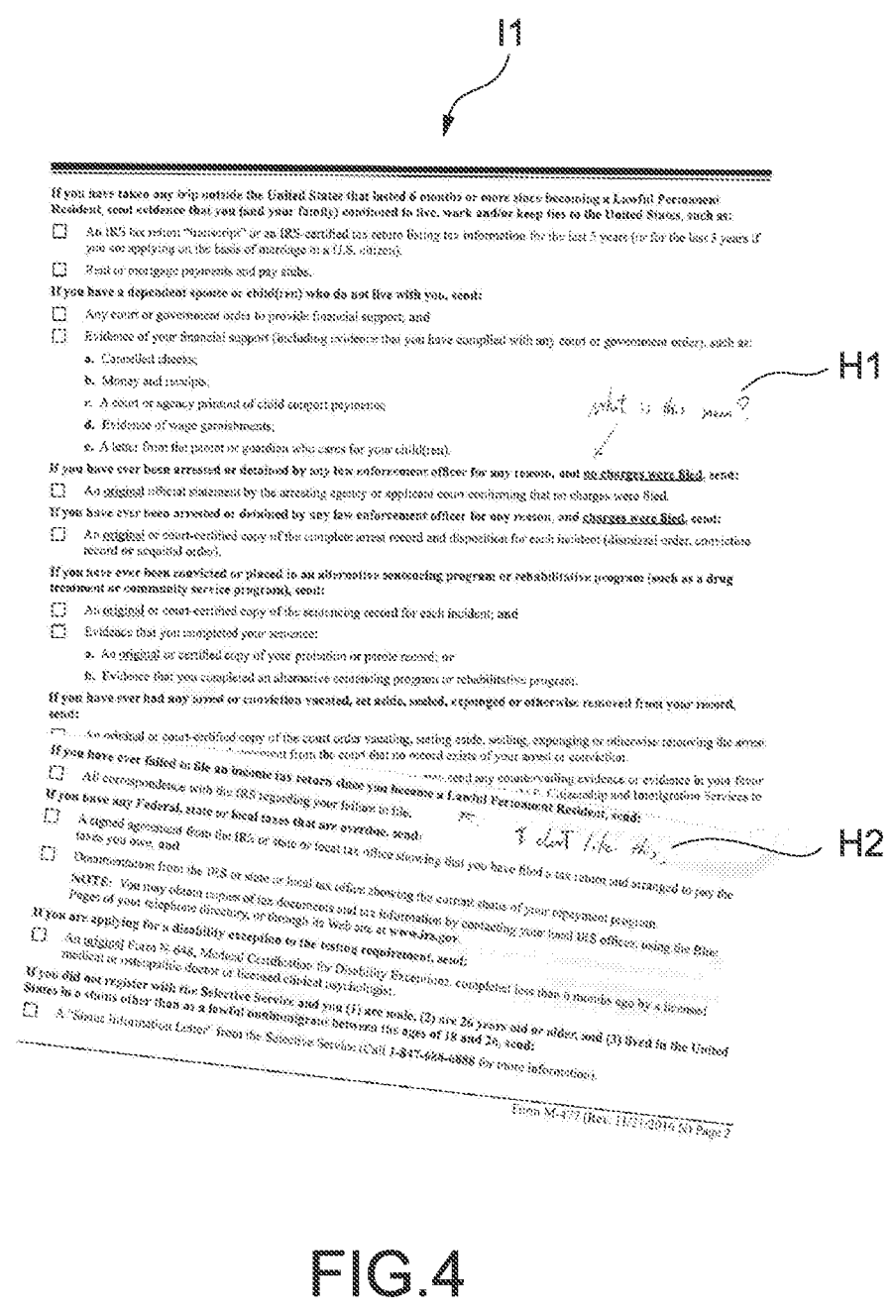

FIG. 4 shows an example of a read image.

In FIG. 4, the read image I1 includes the handwritten characters H1 and H2.

The handwriting removing unit 102 detects the handwritten characters H1 and H2 from the read image I1 by using a known art (edge detection, etc.). If the handwriting removing unit 102 detects the handwritten characters H1 and H2, the handwriting removing unit 102 removes the handwritten characters H1 and H2 from the read image I1 (Step S102). Note that, if the read image includes no handwritten character (no handwritten character is detected), the handwriting removing unit 102 removes no handwritten character from the read image.

Figure 5:
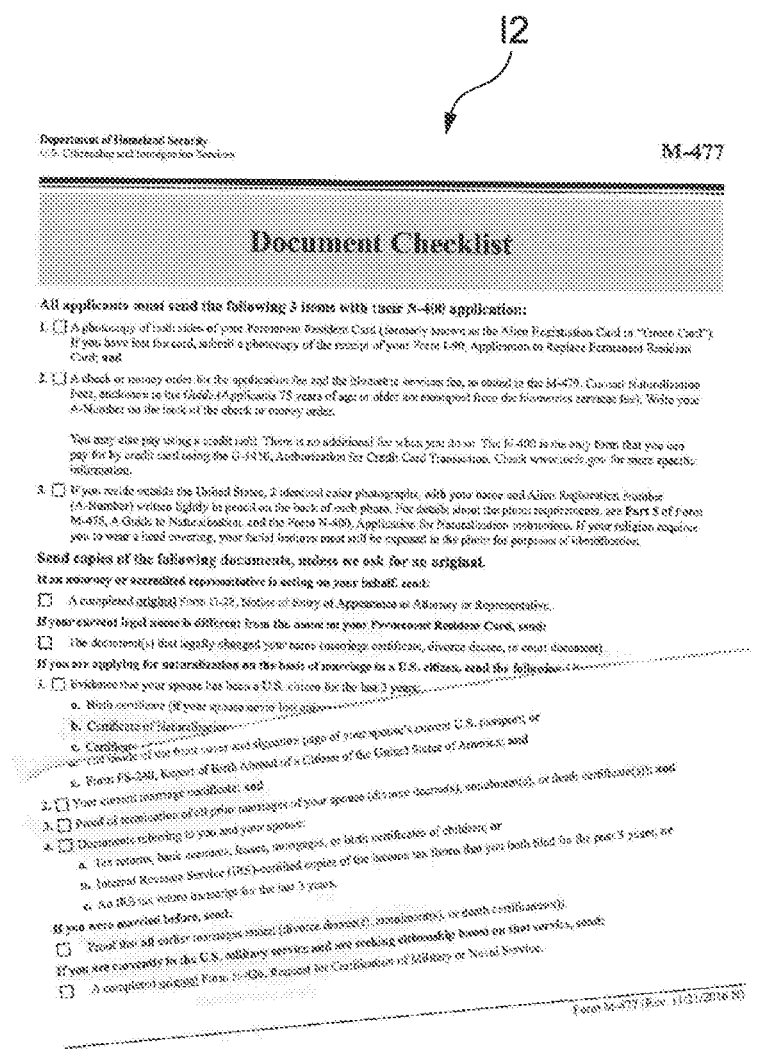

FIG. 5 shows an example of the read image, from which handwritten characters are removed.

In FIG. 5, the read image I2 is generated by removing the handwritten characters H1 and H2 from the read image I1 (FIG. 4).

The character determining unit 103 divides the read image, from which the handwritten characters are removed, into multiple blocks (number of block=N), each of the multiple blocks including multiple characters (Step S103).

Figure 6:
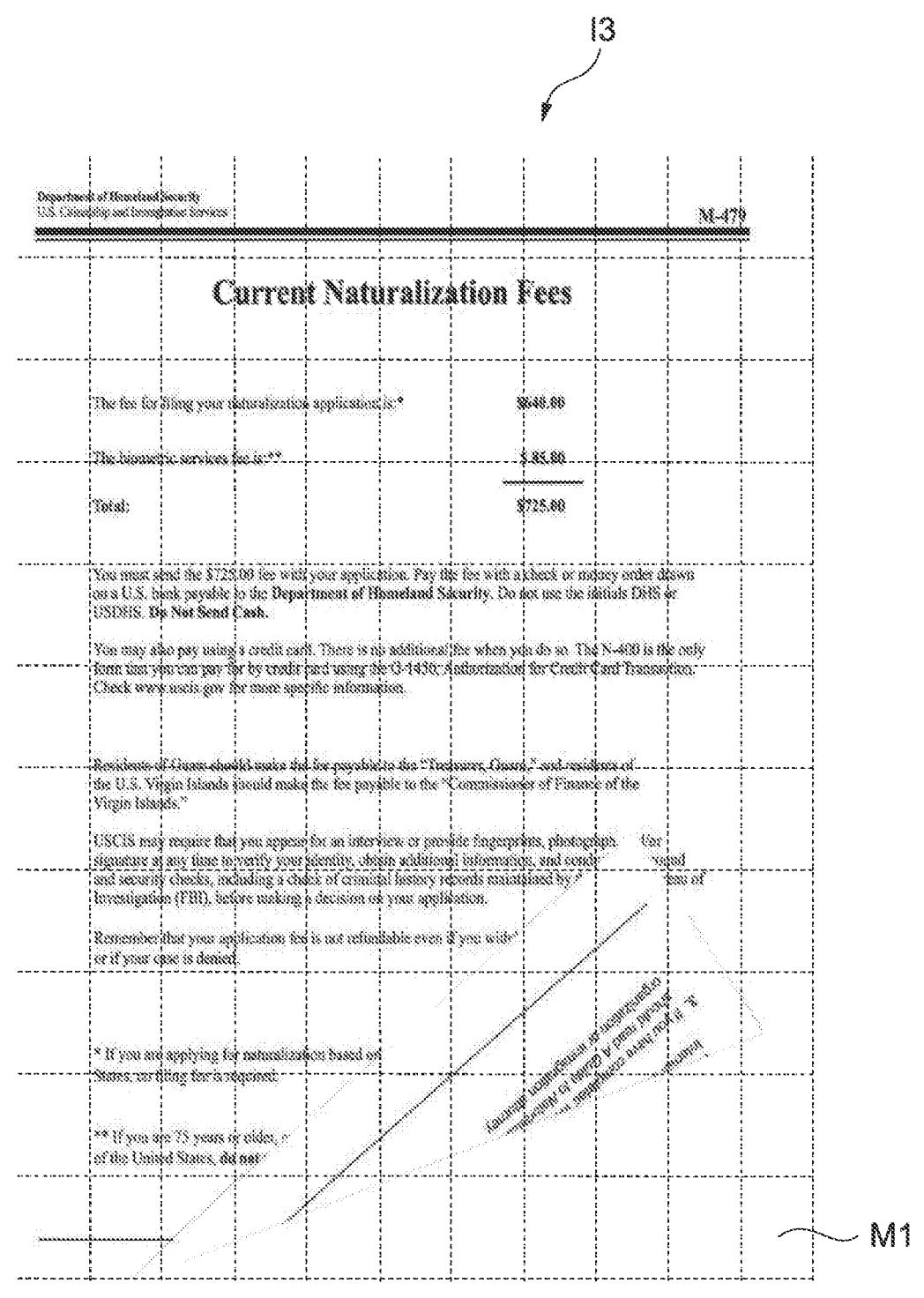

FIG. 6 shows an example of a read image divided into multiple blocks.

In FIG. 6, the read image I3 is a read image different from the read image I2 (FIG. 5). The character determining unit 103 divides the read image I3 into the multiple blocks M1 (number of blocks M1=N). For example, the number of the blocks M1 is N=128×128. Typically, all the blocks M1 (number of blocks M1=N) have the same shape and the same size.

The character determining unit 103 detects multiple characters included in each block (Step S106).

Figure 7:
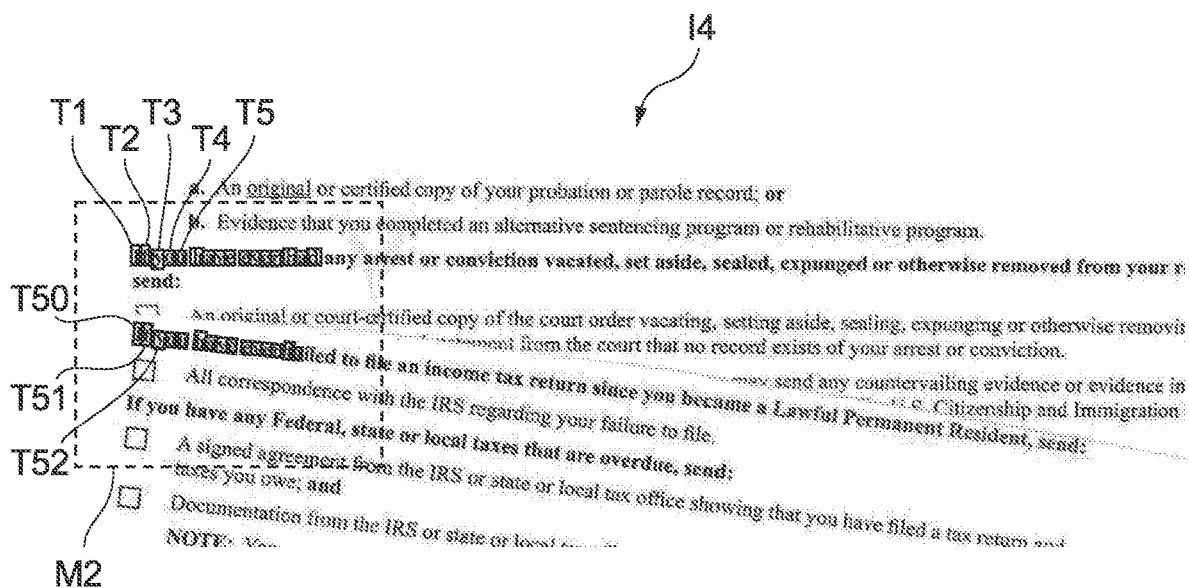
FIG. 7 schematically shows multiple characters included in one block in a read image.

FIG. 7 schematically shows multiple characters included in one block in a read image.

In FIG. 7, the read image I4 is different from the read image I3 (FIG. 6) and the read image I2 (FIG. 5). The read image I4 includes one block M2. In this example, the character determining unit 103 detects multiple characters T1 to T5 . . . T50 to T52 . . . included in the block M2 by using a known art (edge detection, etc.).

The character determining unit 103 detects the inclination of each of the multiple characters T1 to T5 . . . T50 to T52 . . . included in the block M2. The "inclination of a character" means the inclination of a character with respect to an arbitrary reference (for example, coordinate system of read image). The character determining unit 103 records the inclination and the length of each of the multiple characters as the character table 200 in, for example, the RAM 11b (Step S107).

Figure 8:
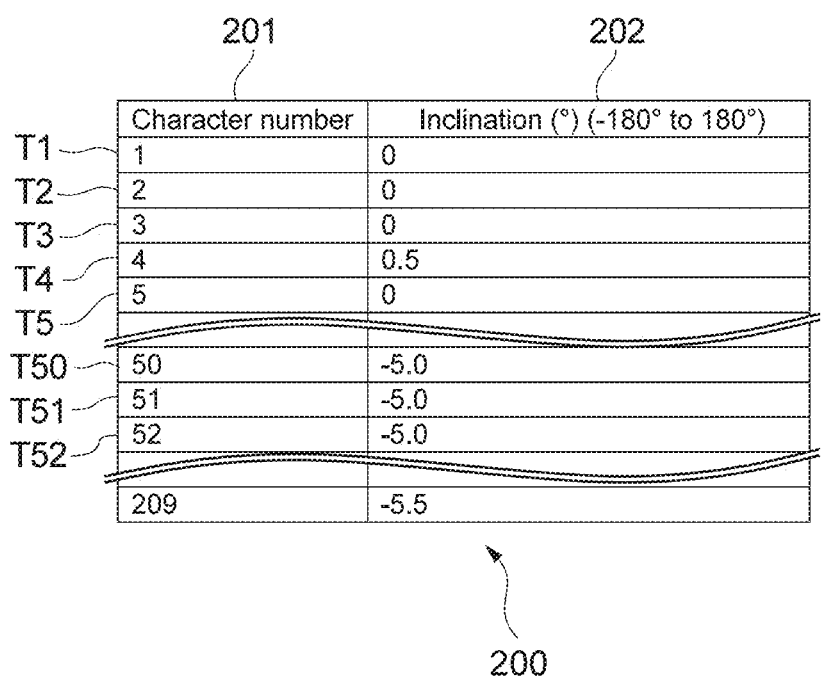
FIG. 8 shows a part of a character table of an example.

FIG. 8 shows a part of a character table of an example.

The character table 200 records, for each character, the character number 201 and the inclination 202. In FIG. 8, the characters T1 to T5 and T50 to T52 recorded in the character table 200 correspond to the characters T1 to T5 and T50 to T52 (FIG. 7) detected from the block M2 in the read image I4. The character number 201 is a serial number that uniquely identifies each character and, in addition, identifies the serial order of each character. The inclination 202 is an angle of −180° to 180°, where the lateral direction of the coordinate system of a read image is 0° (reference), for example.

The block processing unit 104 creates a histogram of the inclinations 202 of all the characters of each of the blocks (Step S108). Specifically, the block processing unit 104 determines an interval, in which the inclination (°) of each character is included.

Figure 9:
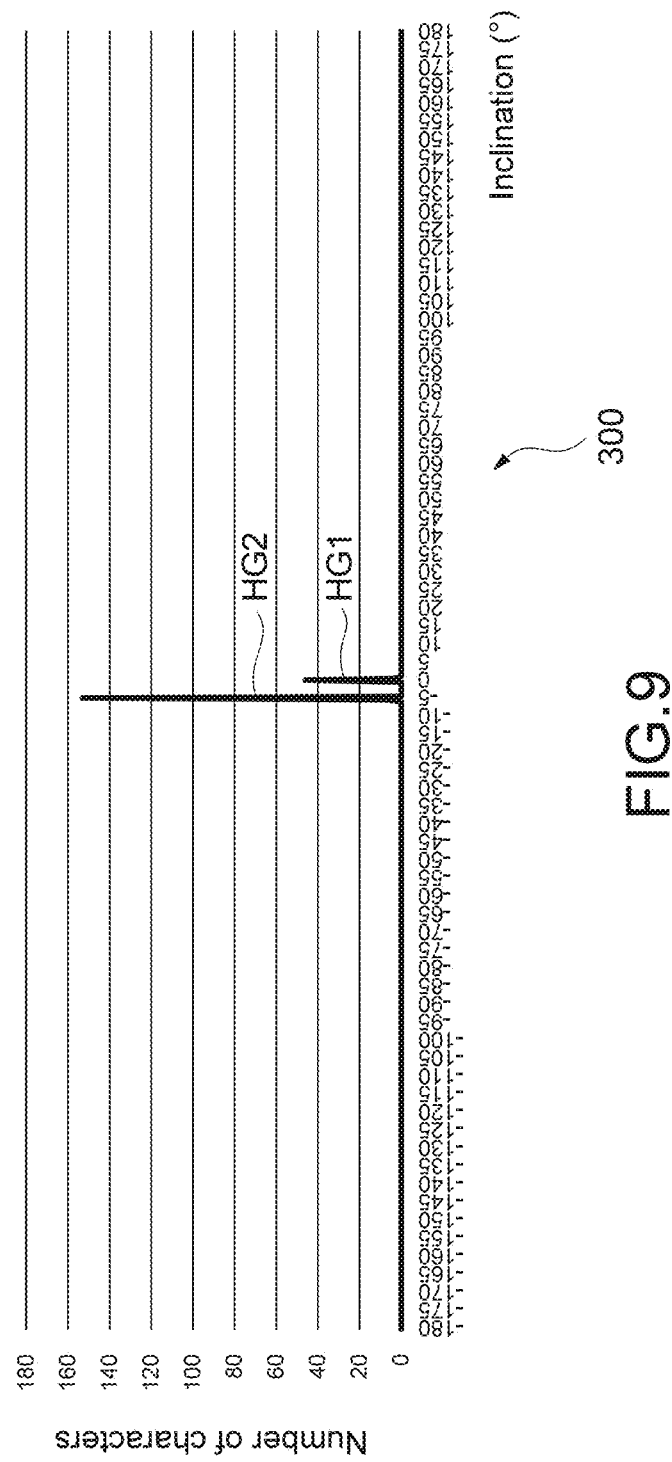
FIG. 9 shows an example of a histogram.

FIG. 9 shows an example of a histogram.

In FIG. 9, the histogram 300 shows a distribution of inclinations of multiple characters included in one block M1, where the inclination interval=1° and the range of angle=−180° to 180°, for example. "The inclination interval=1°" means that one interval includes inclinations equal to or larger than 0° and smaller than 1°. Note that the inclination interval may be a value other than 1° and may be 0.5°, for example. Note that, in FIG. 9, the respective characters included in the histogram correspond to the characters recorded in the character table 200 (FIG. 8) and the multiple characters T1 to T5 . . . T50 to T52 . . . included in the block M2 in the read image I4.

In FIG. 8, the angle 202 of the characters T1, T2, T3, and T5 identified by the character numbers 201=1, 2, 3, and 5 is 0°. So the characters T1, T2, T3, and T5 (value of the angle 202=0°) are included in the inclination interval (HG1 of FIG. 9), which is an interval of numerical values equal to or larger than 0° and smaller than 1°. The angle 202 of the character T4 identified by the character number 201=4 is 0.5°. So the character T4 (value of the angle 202=0.5°) is included in the inclination interval (HG1 of FIG. 9), which is an interval of numerical values equal to or larger than 0° and smaller than 1°.

Meanwhile, the angle 202 of the characters T50, T51, and T52 identified by the character numbers 201=50, 51, and 52 is −5.0°. So the characters T50, T51, and T52 (value of the angle 202=−5.0°) are included in the inclination interval (HG2 of FIG. 9), which is an interval of numerical values equal to or larger than −5° and smaller than −4°.

The block processing unit 104 determines whether or not there is an inclination interval including inclinations of characters, the number of the characters being equal to or larger than a threshold (threshold=L) (first threshold) on the basis of the histogram 300 (Step S109). For example, the threshold L=10. In this example, the block processing unit 104 determines that, as the inclination intervals including inclinations of characters, the number of the characters being equal to or larger than the threshold (L=10), there are the inclination interval (HG2 of FIG. 9) equal to or larger than −5° and smaller than −4° and the inclination interval (HG1 of FIG. 9) equal to or larger than 0° and smaller than 1° on the basis of the histogram 300 (Step S109, Yes)

The block processing unit 104 determines that there is an inclination interval (alternatively, there are inclination intervals) including inclinations of characters in one block, the number of the characters being equal to or larger than the threshold (threshold=L) (Step S109, Yes). Then the block processing unit 104 determines a predetermined number (P) of inclination intervals in the descending order of the number of characters having inclinations included in each inclination interval. For example, P=2. In the example of FIG. 8, the block processing unit 104 determines, as representative values, the inclination interval (HG2 of FIG. 9) equal to or larger than −5° and smaller than −4° and the inclination interval (HG1 of FIG. 9) equal to or larger than 0° and smaller than 1° (Step S110). Hereinafter, a block including multiple inclination intervals will be referred to as a "change point block".

By the way, it is assumed that a block of an unfolded document (normal block) includes only one inclination interval including an inclination of characters, the number the characters being equal to or larger than the threshold (threshold=L) (first threshold). Typically, it is assumed that the inclination of almost all the characters is included in only one inclination interval. For example, it is assumed that the inclination of almost all the characters is included in the inclination interval equal to or larger than 0° and smaller than 1° or the inclination interval equal to or larger than 90° and smaller than 91°. In this case, the block processing unit 104 determines, as the predetermined number (P=2) of the inclination interval, one interval.

Meanwhile, in some cases, the block processing unit 104 determines that one block fails to include an inclination interval including characters having an inclination, the number of the characters being equal to or larger than the threshold L=10) (Step S109, No). Typically, this is a case where the block includes no character at all or the block includes a very small number (for example, less than first threshold) of characters (for example, blocks on edges, etc.). In this case, the block processing unit 104 detects, as an invalid block (N/A), a block failing to include an inclination interval including characters having an inclination, the number of the characters being equal to or larger than the first threshold (Step S111).

The character determining unit 103 and the block processing unit 104 executes the processing on and after Step S106 for all the blocks (Steps S104, S105, and S112). As a result, all the blocks are sorted into the change point blocks (including multiple inclination intervals), the normal blocks (including one inclination interval), and the invalid blocks (including no valid inclination interval).

The fold determining unit 105 determines whether or not all the blocks except for the invalid blocks are normal blocks (Step S113). In other words, the fold determining unit 105 determines whether or not a change point block is detected. The case that "all the blocks except for the invalid blocks are normal blocks" (Step S113, Yes) means that the inclinations of almost all the characters included in the read image are almost the same. Therefore the fold determining unit 105 determines that the document is not folded (alternatively, probability that at least part including characters is not folded is high) (Step S119).

Meanwhile, the case that "a change point block is detected" (Step S113, No) means that the inclinations of the characters included in the read image have variations, i.e., there is a probability that the document is folded. In this case, the fold determining unit 105 determines change point block types of the change point blocks in the read image as follows.

Figure 10:
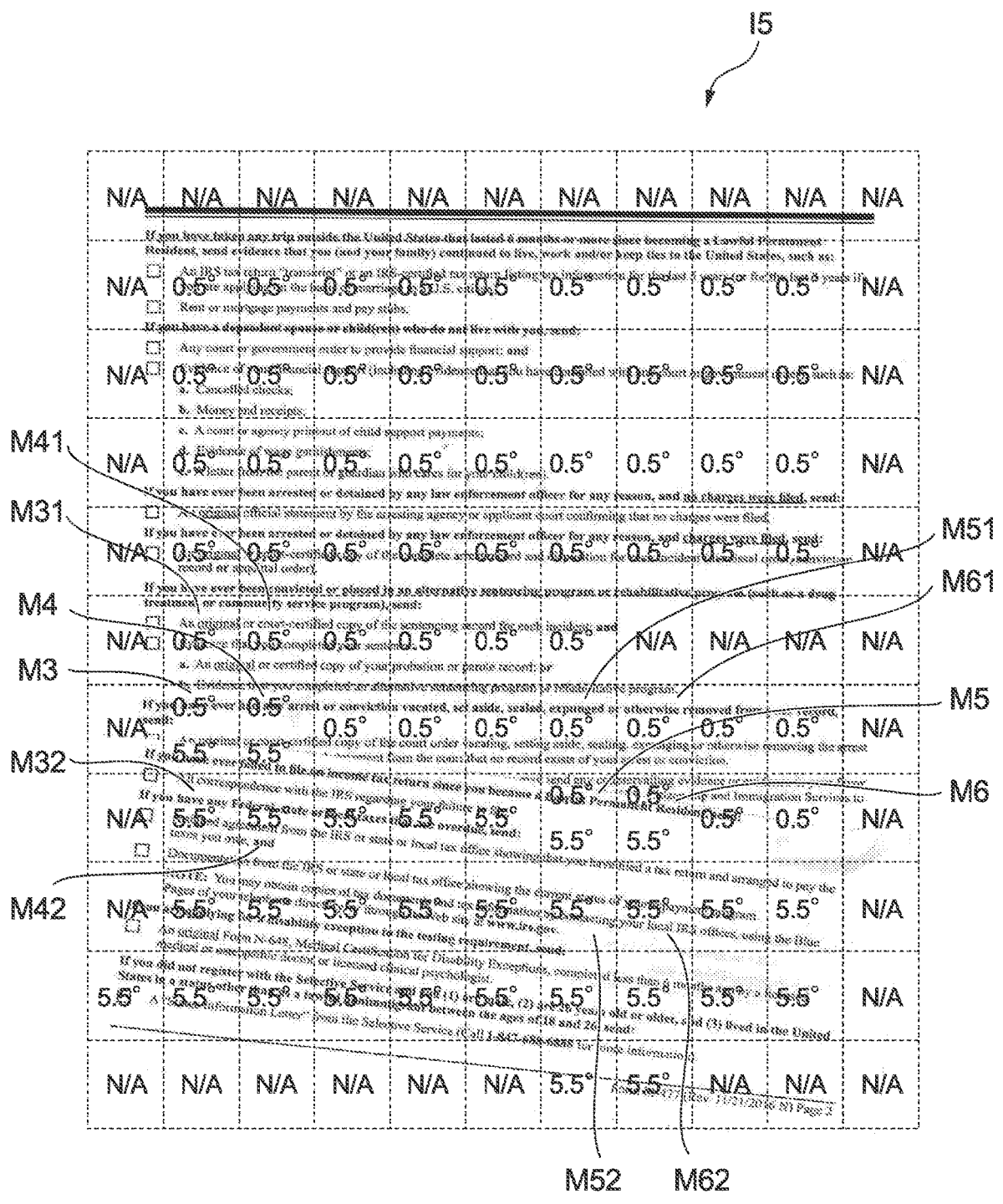
Figure 11:
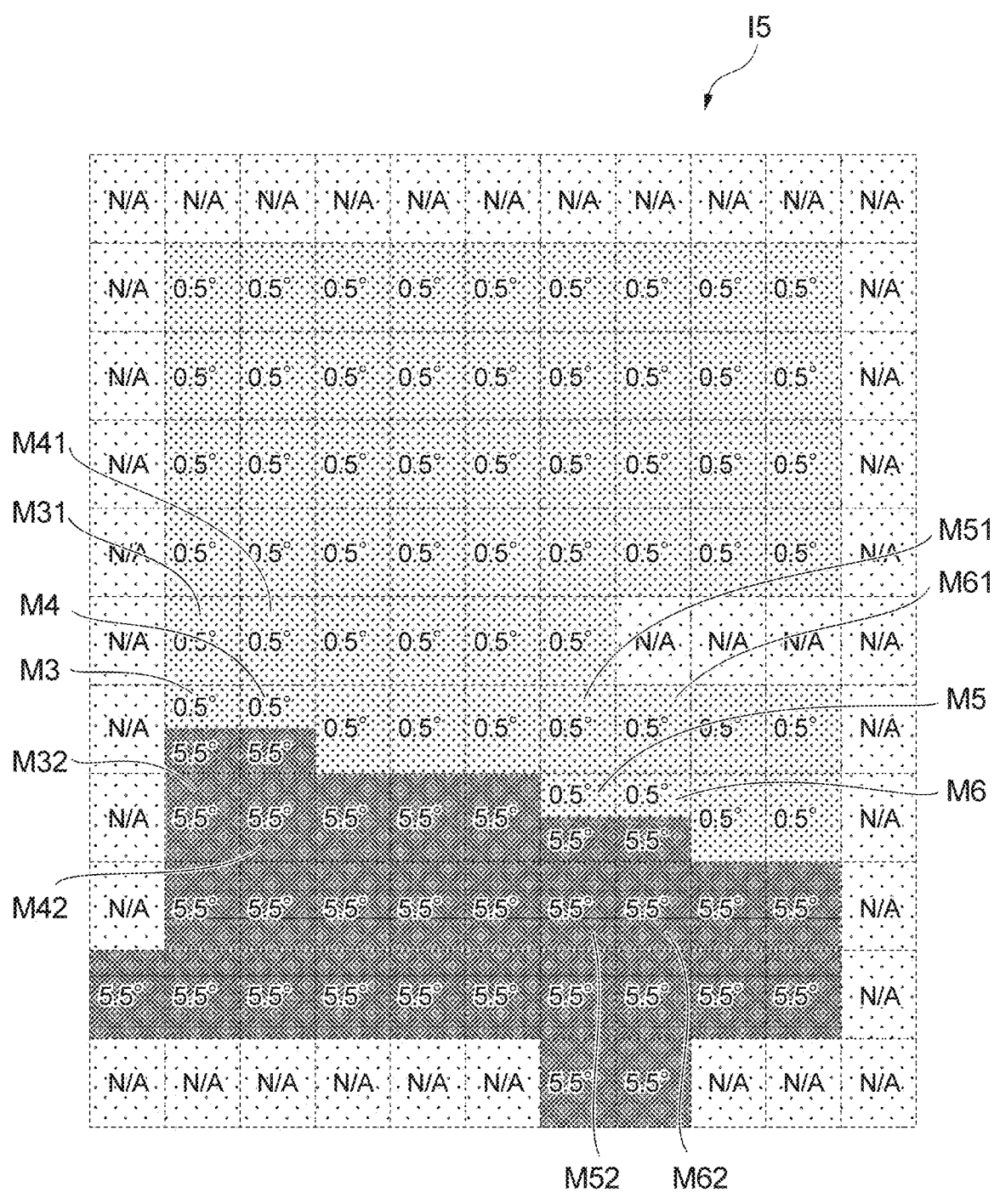

FIG. 10 illustrates an example of blocks included in a read image. FIG. 11 schematically shows an example of the blocks of FIG. 10.

In FIG. 10, the read image I5 is a read image different from the read image I4 (FIG. 7), the read image I3 (FIG. 6), and the read image I2 (FIG. 5). In FIG. 10, the read image I2 includes the change point blocks M3, M4, M5, and M6. FIG. 11 schematically shows the read image I5 of FIG. 10 without the characters in order to improve visualization. The arrangement of the blocks of FIG. 10 is the same as the arrangement of the blocks of FIG. 11.

The change point block M3 will be described as an example. The representative values (Step S110) of the change point block M3 are the first inclination interval ("5.5°" indicates the first inclination interval for convenience, which means the inclination interval equal to or larger than 5° and smaller than 6°) and the second inclination interval ("0.5°" indicates the second inclination interval for convenience, which means the inclination interval equal to or larger than 0° and smaller than 1°). The fold determining unit 105 virtually locates the first inclination interval (5.5°) of the change point block M3 in the change point block M3 such that the first inclination interval (5.5°) is adjacent to one normal block M31, the one normal block M31 including characters having the inclination included in the first inclination interval (5.5°) and being adjacent to the change point block M3. Next, the fold determining unit 105 virtually locates the second inclination interval (0.5°) of the change point block M3 in the change point block M3 such that the second inclination interval (0.5°) is adjacent to one other normal block M32, the one other normal block M32 including characters having the inclination included in the second inclination interval (0.5°) and being adjacent to the change point block M3. In short, the fold determining unit 105 virtually locates the first inclination interval (5.5°) in the change point block M3 such that the first inclination interval (5.5°) is adjacent to the normal block M31 having the common first inclination interval (5.5°). The fold determining unit 105 virtually locates the second inclination interval (0.5°) in the change point block M3 such that the second inclination interval (0.5°) is adjacent to the normal block M32 having the common second inclination interval (0.5°).

Similarly, the fold determining unit 105 virtually locates the first inclination interval (5.5°) in the change point block M4 such that the first inclination interval (5.5°) is adjacent to one normal block M41 having the common first inclination interval (5.5°). The fold determining unit 105 virtually locates the second inclination interval (0.5°) in the change point block M4 such that the second inclination interval (0.5°) is adjacent to one other normal block M42 having the common second inclination interval (0.5°). The fold determining unit 105 virtually locates the first inclination interval (5.5°) in the change point block M5 such that the first inclination interval (5.5°) is adjacent to one normal block M51 having the common first inclination interval (5.5°). The fold determining unit 105 virtually locates the second inclination interval (0.5°) in the change point block M5 such that the second inclination interval (0.5°) is adjacent to one other normal block M52 having the common second inclination interval (0.5°). The fold determining unit 105 virtually locates the first inclination interval (5.5°) in the change point block M6 such that the first inclination interval (5.5°) is adjacent to one normal block M61 having the common first inclination interval (5.5°). The fold determining unit 105 virtually locates the second inclination interval (0.5°) in the change point block M6 such that the second inclination interval (0.5°) is adjacent to one other normal block M62 having the common second inclination interval (0.5°).

As a result, the values (5.5/0.5) and the positional relation (low/high in coordinate system) of the first inclination interval and the second inclination interval of all the change point blocks M3, M4, M5, and M6 are common. A change point block type is defined by values and a positional relation of the first inclination interval and the second inclination interval. In this example, the change point block type of all the change point blocks M3, M4, M5, and M6 is common. In other words, the number of the change point block type of the change point blocks M3, M4, M5, and M6 is one.

The change point block type has been described above. If a change point block is detected (Step S113, No), the fold determining unit 105 determines whether or not the document is folded (alternatively, at least the probability that the document is folded is high) on the basis of the number of change point block types included in the document image.

Where the preset detection level is a high level (Step S114, Yes), if the fold determining unit 105 determines that the document image includes even one change point block type (Step S116, Yes), the fold determining unit 105 determines that the document is folded (alternatively, at least the probability that the document is folded is high) (Step S120). Meanwhile, if the fold determining unit 105 determines that the document image includes no change point block (Step S116, No), the fold determining unit 105 determines that the document is not folded (alternatively, probability that at least part including characters is not folded is high) (Step S119).

Where the preset detection level is a middle level (Step S114, No, and Step S115, No), if the fold determining unit 105 determines that the number of change point block types of the change point blocks included in the document image is equal to or larger than 1 and equal to or smaller than 3 (equal to or smaller than second threshold) (Step S117, Yes), the fold determining unit 105 determines that the document is folded (alternatively, at least the probability that the document is folded is high) (Step S120). Meanwhile, if the fold determining unit 105 determines that the number of change point block types of the change point blocks included in the document image is larger than 3 (larger than second threshold) (Step S117, No), the fold determining unit 105 determines that the document is not folded (alternatively, probability that at least part including characters is not folded is high) (Step S119).

Where the preset detection level is a low level (Step S114, No, and Step S115, Yes), if the fold determining unit 105 determines that the number of change point block types of the change point blocks included in the document image is equal to or larger than 1 and equal to or smaller than 5 (equal to or smaller than second threshold) (Step S118, Yes), the fold determining unit 105 determines that the document is folded (alternatively, at least the probability that the document is folded is high) (Step S120). Meanwhile, if the fold determining unit 105 determines that the number of change point block types of the change point blocks included in the document image is larger than 5 (larger than second threshold) (Step S118, No), the fold determining unit 105 determines that the document is not folded (alternatively, probability that at least part including characters is not folded is high) (Step S119).

By the way, if the fold determining unit 105 determines that the number of the change point block types is larger than the second threshold (Step S117, No, and S118, No), the fold determining unit 105 determines that the document is not folded (Step S119). The reason of that will be described.

Figure 12:
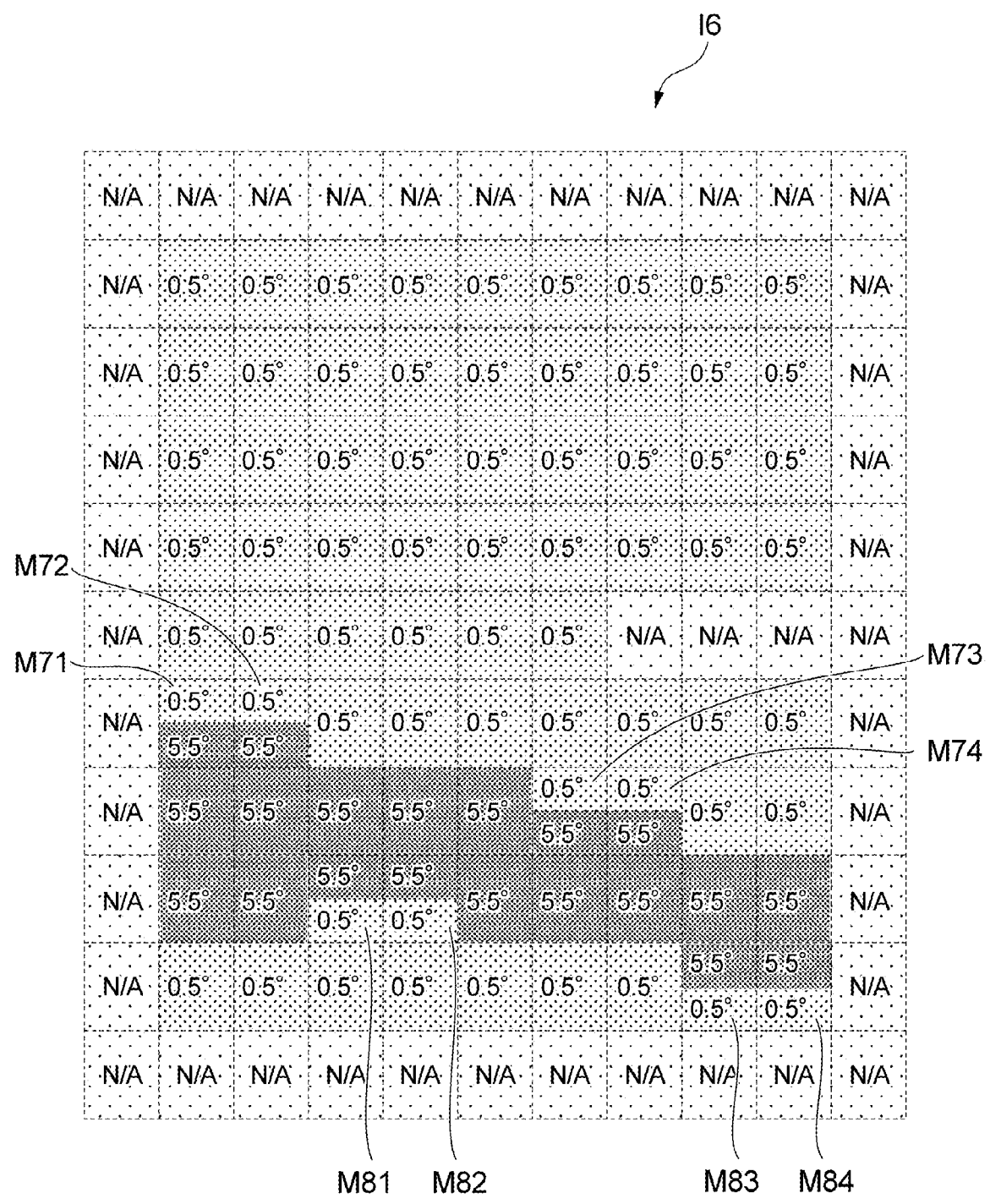

FIG. 12 schematically shows another example of blocks in a read image.

FIG. 12 schematically shows a read image (not shown) without characters in order to improve visualization. In FIG. 12, the read image I6 includes the change point blocks M71, M72, M73, M74, M81, M82, M83, and M84. The values (5.5/0.5) and the positional relation (low/high in coordinate system) of the first inclination interval and the second inclination interval of the change point blocks M71, M72, M73, and M74 are common. Meanwhile, the values (5.5/0.5) and the positional relation (high/low in coordinate system) of the first inclination interval and the second inclination interval of the change point blocks M81, M82, M83, and M84 are common. The values (5.5/0.5) of the first inclination interval and the second inclination interval of the change point blocks M71, M72, M73, M74, M81, M82, M83, and M84 are common. However, the positional relation (low/high or high/low in coordinate system) of the values (5.5/0.5) is not common. Therefore, in this case, the number of change point block types defined by the values and the positional relation of the first inclination interval and the second inclination interval is "2".

A situation where the number of the change point block types is a relatively small value such as 1 (case of FIG. 11) or 2 (case of FIG. 12) is very unusual for a typical layout of character strings. Therefore, if the number of the change point block types is relatively small, the fold determining unit 105 determines that the document is folded (alternatively, at least the probability that the document is folded is high) (Step S120).

Meanwhile, a situation where the number of the change point block types is relatively large suggests that the document is folded relatively a large number of times. However, if the document is actually folded a large number of times, a user should have noticed that fact at a time when the user puts the document on a platen. (Note that it applies to not a case where the image scanner 12 optically reads a document fed by an automatic feeder, but only a case where the image scanner 12 optically reads a document put on a platen (not shown) by a user.) So, if the number of the change point block types is relatively large, there is a probability that the characters are originally inclined randomly (for example, in multiple directions from one point). Therefore, if the fold determining unit 105 determines that the number of the change point block types is larger than the second threshold (Step S117, No, and S118, No), the fold determining unit 105 determines that the document is not folded (Step S119). Note that, if the number of the change point block types is relatively large, there is a probability that a user should have folded the document on purpose (in order to mask part of the document, etc.). However, if the user have folded the document on purpose, the fold determining unit 105 may determine that the document is not (unintentionally) folded (Step S119).

If the document is folded (alternatively, at least the probability that the document is folded is high) (Step S120), the fold information output unit 106 outputs (for example, displays on the display device 17*a*) information indicating that the document is folded (Step S121). The "information indicating that the document is folded" includes, for example, a message for urging a user to re-scan the document. Alternatively, the "information indicating that the document is folded" includes the result of optical character recognition (OCR) of the read image I2 and a message for urging a user to check the result.

Note that, where multiple pages of documents are scanned, typically, if the fold information output unit 106 determines that one page of document is folded (alternatively, at least the probability that the document is folded is high), the fold information output unit 106 may output the information indicating that the document is folded before starting the operational flow (on and after Step S101) for the next page.

4. Conclusion (1) According to the present embodiment, if there is detected even one change point block, the change point block being a block including characters having an inclination included in a first inclination interval, a number of the characters being equal to or larger than a first threshold, and including characters having an inclination included in a second inclination interval, a number of the characters being equal to or larger than the first threshold, the second inclination interval being different from the first inclination interval (Step S116, Yes), the fold determining unit 105 determines that the document is folded (Step S120). As described above, the fold determining unit 105 determines that a document is folded if the fold determining unit 105 detects characters having different inclination intervals in one block, the number of the characters included in each of the different inclination intervals being equal to or larger than the first threshold. Therefore the fold determining unit 105 may determine that a document is folded with a high degree of precision.

(2) According to the present embodiment, the fold determining unit 105 determines that a document is folded (Step S120) on the basis of the number of the change point block types (Step S117, Yes, and S118, Yes). Therefore the fold determining unit 105 may determine that a document is folded with a much higher degree of precision than a case where a change point block type is not determined.

(3) According to the present embodiment, if the fold determining unit 105 determines that the number of the change point block types is larger than the second threshold (Step S117, No, and S118, No), the fold determining unit 105 determines that a document is not folded (Step S119). So, if the number of the change point block types is larger than the second threshold because, for example, there is a probability that the characters are originally inclined randomly (for example, in multiple directions from one point), the fold determining unit 105 does not determine that the document is folded. Therefore the fold determining unit 105 may determine that a document is folded with a much higher degree of precision.

(4) According to the present embodiment, the block processing unit 104 excludes, from the change point block, an invalid block (Step S109, No), the invalid block being a block failing to include an inclination interval including characters having an inclination, a number of the characters being equal to or larger than the first threshold (Step S111). As a result, a block only including a very small number (for example, less than first threshold) of characters is excluded from a block including characters whose inclinations are to be determined. As a result, the probability that it is improperly determined that a document is folded even if the document is not folded actually may be reduced.

(5) According to the present embodiment, the fold determining unit 105 determines that the document is not folded if the change point block is not detected (Step S113, Yes). As a result, if the inclinations of the many characters included in the read image are approximately the same, the fold determining unit 104 determines that the document is not folded (alternatively, the probability that at least part including the characters is not folded is high). Therefore the fold determining unit 104 may determine that a document is not folded with a high degree of precision.

(6) According to the present embodiment, the character determining unit 103 detects the multiple characters (Step S103) from the read image I2 from which the handwritten characters H1 and H2 are removed (Step S102). The inclination of handwritten characters may be different from the inclination of printed characters. Because of that, if characters (including the handwritten characters H1 and H2) are detected from the read image I1 including the handwritten characters H1 and H2, since the inclinations of handwritten characters H1 and H2 are different from the inclination of prints characters, it may be improperly determined that a document is folded even if the document is not folded actually. To the contrary, according to the present embodiment, the handwritten characters H1 and H2 are removed.

As a result, the probability that it is improperly determined that a document is folded even if the document is not folded actually may be reduced.

(7) According to the present embodiment, fold information output unit 107 outputs information indicating that the document is folded (Step S121). As a result, a user may re-scan the document. Alternatively, a user may check, with the eyes, the result of optical character recognition (OCR) of the read image I2. Note that, where multiple pages of documents are scanned, if the fold information output unit 105 determines that one page of document is folded, the fold information output unit 105 may output the information indicating that the document is folded before starting the operational flow (on and after Step S101) for the next page. As a result, a user may know which page of document is folded. In other words, it is not necessary for the user to search all the pages of read images for a folded document page afterwards. So there is no loss of time.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   a controller circuit configured to operate as
   an image obtaining unit configured to obtain a read image, the read image being generated by optically reading a document including multiple characters by an image scanner,
   a character determining unit configured to
      divide the read image into multiple blocks, each of the multiple blocks including multiple characters, and
      determine an inclination of each of the multiple characters included in each of the multiple blocks,
   a block processing unit configured to detect a change point block, the change point block being a block including characters having an inclination included in a first inclination interval, a number of the characters being equal to or larger than a first threshold, and including characters having an inclination included in a second inclination interval, a number of the characters being equal to or larger than the first threshold, the second inclination interval being different from the first inclination interval, and
   a fold determining unit configured to determine that the document is folded if the change point block is detected.

2. The image processing apparatus according to claim 1, wherein
   the block processing unit is further configured to
      detect multiple change point blocks, and
      detect multiple normal blocks, each of the multiple normal blocks being a block including characters having an inclination included in only one inclination interval, a number of the characters being equal to or larger than the first threshold, and
   the fold determining unit is further configured to,
      with respect to each of the multiple change point blocks,
         virtually locate the first inclination interval of the change point block in the change point block such that the first inclination interval is adjacent to one normal block, the one normal block including characters having the inclination included in the first inclination interval and being adjacent to the change point block, and
         virtually locate the second inclination interval of the change point block in the change point block such that the second inclination interval is adjacent to one other normal block, the one other normal block including characters having the inclination included in the second inclination interval and being adjacent to the change point block, and
      determine that the document is folded if it is determined that a number of a change point block type is smaller than a second threshold, the change point block type being defined by values and a positional relation of the first inclination interval and the second inclination interval virtually located in each of the multiple change point blocks.

3. The image processing apparatus according to claim 2, wherein
   the fold determining unit is further configured to determine that the document is not folded if it is determined that a number of the change point block types is larger than the second threshold.

4. The image processing apparatus according to claim 1, wherein
   the block processing unit is further configured to
      detect an invalid block, the invalid block being a block failing to include an inclination interval including characters having an inclination, a number of the characters being equal to or larger than the first threshold, and
      exclude the invalid block from the change point block.

5. The image processing apparatus according to claim 1, wherein
   the fold determining unit is further configured to determine that the document is not folded if the change point block is not detected.

6. The image processing apparatus according to claim 1, wherein
   the controller circuit is further configured to operate as a handwriting removing unit configured to remove a handwritten character from the read image, and
   the character determining unit is configured to detect the multiple characters from the read image from which the handwritten character is removed.

7. The image processing apparatus according to claim 1, wherein
   the controller circuit is further configured to operate as a fold information output unit configured to output, if it is determined that the document is folded by the fold determining unit, information indicating that the document is folded.

8. A non-transitory computer readable recording medium that records an image processing program causing a controller circuit of an image processing apparatus to operate as:
   an image obtaining unit configured to obtain a read image, the read image being generated by optically reading a document including multiple characters by an image scanner;
   a character determining unit configured to
      divide the read image into multiple blocks, each of the multiple blocks including multiple characters, and
      determine an inclination of each of the multiple characters included in each of the multiple blocks;
   a block processing unit configured to detect a change point block, the change point block being a block including characters having an inclination included in a first inclination interval, a number of the characters being equal to or larger than a first threshold, and including characters having an inclination included in a second inclination interval, a number of the characters being equal to or larger than the first threshold, the second inclination interval being different from the first inclination interval; and a fold determining unit configured to determine that the document is folded if the change point block is detected.

9. The non-transitory computer readable recording medium according to claim 8, wherein the block processing unit is further configured to
detect multiple change point blocks, and
detect multiple normal blocks, each of the multiple normal blocks being a block including characters having an inclination included in only one inclination interval, a number of the characters being equal to or larger than the first threshold, and the fold determining unit is further configured to,
with respect to each of the multiple change point blocks,
virtually locate the first inclination interval of the change point block in the change point block such that the first inclination interval is adjacent to one normal block, the one normal block including characters having the inclination included in the first inclination interval and being adjacent to the change point block, and
virtually locate the second inclination interval of the change point block in the change point block such that the second inclination interval is adjacent to one other normal block, the one other normal block including characters having the inclination included in the second inclination interval and being adjacent to the change point block, and
determine that the document is folded if it is determined that a number of a change point block type is smaller than a second threshold, the change point block type being defined by values and a positional relation of the first inclination interval and the second inclination interval virtually located in each of the multiple change point blocks.

10. The non-transitory computer readable recording medium according to claim 9, wherein the fold determining unit is further configured to determine that the document is not folded if it is determined that a number of the change point block types is larger than the second threshold.

11. The non-transitory computer readable recording medium according to claim 8, wherein the block processing unit is further configured to
detect an invalid block, the invalid block being a block failing to include an inclination interval including characters having an inclination, a number of the characters being equal to or larger than the first threshold, and
exclude the invalid block from the change point block.

12. The non-transitory computer readable recording medium according to claim 8, wherein the fold determining unit is further configured to determine that the document is not folded if the change point block is not detected.

13. The non-transitory computer readable recording medium according to claim 8, wherein the image processing program causes the controller circuit of the image processing apparatus to further operate as a handwriting removing unit configured to remove a handwritten character from the read image, and the character determining unit is configured to detect the multiple characters from the read image from which the handwritten character is removed.

14. An image processing method, comprising:

by an image obtaining unit, obtaining a read image, the read image being generated by optically reading a document including multiple characters by an image scanner;

by a character determining unit,
dividing the read image into multiple blocks, each of the multiple blocks including multiple characters, and
determining an inclination of each of the multiple characters included in each of the multiple blocks;

by a block processing unit, detecting a change point block, the change point block being a block including characters having an inclination included in a first inclination interval, a number of the characters being equal to or larger than a first threshold, and including characters having an inclination included in a second inclination interval, a number of the characters being equal to or larger than the first threshold, the second inclination interval being different from the first inclination interval; and by a fold determining unit, determining that the document is folded if the change point block is detected.

15. The image processing method according to claim 14, further comprising:

by the block processing unit,
detecting multiple change point blocks, and
detecting multiple normal blocks, each of the multiple normal blocks being a block including characters having an inclination included in only one inclination interval, a number of the characters being equal to or larger than the first threshold; and by the fold determining unit,
with respect to each of the multiple change point blocks,
virtually locating the first inclination interval of the change point block in the change point block such that the first inclination interval is adjacent to one normal block, the one normal block including characters having the inclination included in the first inclination interval and being adjacent to the change point block, and
virtually locating the second inclination interval of the change point block in the change point block such that the second inclination interval is adjacent to one other normal block, the one other normal block including characters having the inclination included in the second inclination interval and being adjacent to the change point block, and
determining that the document is folded if it is determined that a number of a change point block type is smaller than a second threshold, the change point block type being defined by values and a positional relation of the first inclination interval and the second inclination interval virtually located in each of the multiple change point blocks.

16. The image processing method according to claim 15, further comprising:

by the fold determining unit, determining that the document is not folded if it is determined that a number of the change point block types is larger than the second threshold.

17. The image processing method according to claim 14, further comprising:
- by the block processing unit,
  - detecting an invalid block, the invalid block being a block failing to include an inclination interval including characters having an inclination, a number of the characters being equal to or larger than the first threshold, and
  - excluding the invalid block from the change point block.

18. The image processing method according to claim 14, further comprising:
- by the fold determining unit, determining that the document is not folded if the change point block is not detected.

19. The image processing method according to claim 14, further comprising:
- by a handwriting removing unit, removing a handwritten character from the read image; and
- by the character determining unit, detecting the multiple characters from the read image from which the handwritten character is removed.

\* \* \* \* \*